United States Patent
Fukatsu

(10) Patent No.: US 8,854,006 B2
(45) Date of Patent: Oct. 7, 2014

(54) CHARGE CONTROL DEVICE

(75) Inventor: Hiroki Fukatsu, Anjo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 590 days.

(21) Appl. No.: 13/214,796

(22) Filed: Aug. 22, 2011

(65) Prior Publication Data

US 2012/0049796 A1 Mar. 1, 2012

(30) Foreign Application Priority Data

Aug. 25, 2010 (JP) .................. 2010-188285

(51) Int. Cl.
  *H01M 10/46* (2006.01)
  *H02J 7/00* (2006.01)
  *B60L 11/18* (2006.01)

(52) U.S. Cl.
  CPC ............ *B60L 11/1809* (2013.01); *Y02T 90/128* (2013.01); *Y04S 30/14* (2013.01); *Y02T 10/7005* (2013.01); *H02J 7/0027* (2013.01); *Y02T 90/169* (2013.01); *Y02T 90/16* (2013.01); *Y02T 10/7088* (2013.01); *Y02T 10/7055* (2013.01); *Y02T 90/163* (2013.01); *B60L 11/184* (2013.01); *Y02T 90/14* (2013.01)
  USPC ....................................... 320/133

(58) Field of Classification Search
  USPC .......... 320/101, 107, 109, 124, 125, 133, 135
  See application file for complete search history.

(56) References Cited

U.S. PATENT DOCUMENTS

| | | | | |
|---|---|---|---|---|
| 5,237,259 A | * | 8/1993 | Sanpei ..................... | 320/158 |
| 5,650,710 A | | 7/1997 | Hotta | |
| 2010/0262566 A1 | | 10/2010 | Yamamoto | |

FOREIGN PATENT DOCUMENTS

| | | | |
|---|---|---|---|
| JP | 02-280633 A | 11/1990 | |
| JP | 3-104046 A | 10/1991 | |
| JP | 11-266509 A | 9/1999 | |
| JP | 2010-142025 A | 6/2010 | |
| JP | 2010-142026 A | 6/2010 | |
| WO | WO 2009/075313 A1 | 6/2009 | |

OTHER PUBLICATIONS

Japanes Office Action in Japanese Application No. 2010-188285, dated Dec. 19, 2013.
European Search Report for EP 11178484.9 mailed Apr. 11, 2013.
Chinese Office Action issued Apr. 30, 2014 for Chinese Application No. 201110245383.5.

* cited by examiner

*Primary Examiner* — Edward Tso
(74) *Attorney, Agent, or Firm* — Birch, Stewart, Kolasch & Birch, LLP

(57) ABSTRACT

A charge control device includes: a communication unit that receives a first instruction for setting a charging wait period, which is a period for waiting the charging operation by the battery charger, and a second instruction for setting a charging period, which is a period for executing the charging operation; a first timing unit that starts first timing operation for calculating a remaining charging wait period, which is a remaining period of the charging wait period, by subtracting an elapsed period from the charging wait period; a charging start unit that allows the battery charger to start the charging operation when the remaining charging wait period becomes zero; a second timing unit that starts second timing operation, together with start of the charging operation, for calculating a remaining charging period, which is a remaining period of the charging period, by subtracting an elapsed period from the charging period; and a charging stop unit that allows the battery charger to stop the charging operation when the remaining charging period becomes zero.

12 Claims, 6 Drawing Sheets

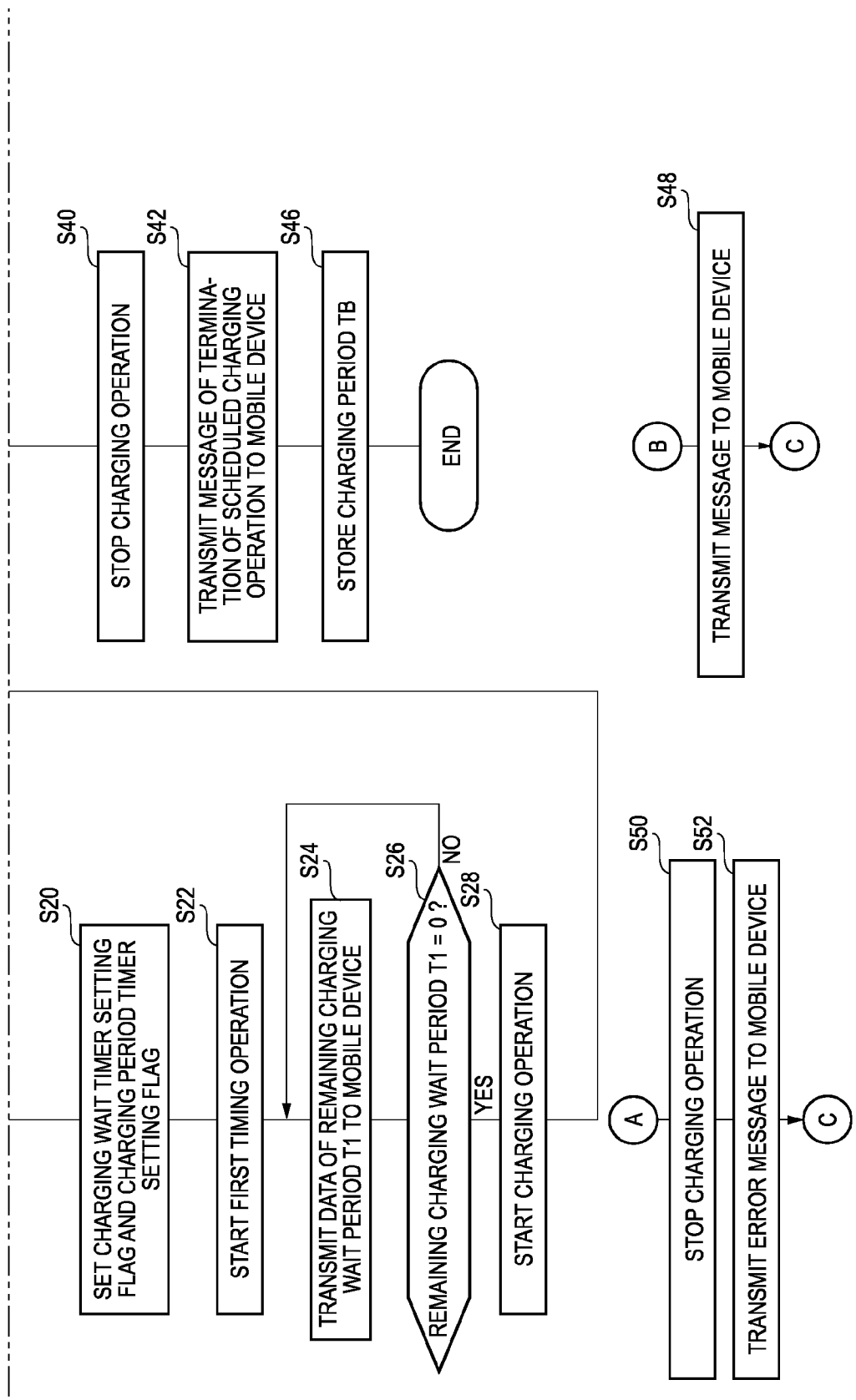

CHARGE CONTROL DEVICE

BACKGROUND OF THE INVENTION

The present invention relates to a charge control device that controls the operation of a battery charger for a travel battery mounted on an electric vehicle.

An electric vehicle or a plug-in hybrid vehicle includes a travel battery that supplies an electric power to a travel driving source, and a battery charger that charges the travel battery. When a power supply that is supplied to an outlet of a housing is used as an external power supply for charging the travel battery, it is desired to charge the travel battery with the use of a late-night electric power cheaper in power charges than a normal electric power (daytime electric power). Under the circumstance, there has been proposed a related-art technique in which a charging start time for starting to charge the travel battery is set for a battery charger by the aid of a remote controller so that the battery charger starts charging operation at the charge start time, and means for selectively making setting of the charge start time effective or ineffective is provided (refer to JP-A-2010-142026). In using this battery charger, a user appropriately sets the charge start time in a predetermined time zone of the late-night electric power, for example from 23:00 night to 8:00 the next day.

However, in the above related-art technique, because a termination time of the charging operation is not set, the charging operation may not be terminated even if it exceeds the time zone of the late-night electric power. This situation occurs, for example, when the amount of charge at the charge start time of the travel battery is very small, and a charging time required for full charge exceeds the time zone of the late-night electric power, or when the charge start time is later than the start time in the time zone of the late-night electric power. Since such situations occur, there is room for improvement in satisfying the intention of the user who intends to charge the travel battery by the aid of only the late-night electric power.

SUMMARY

It is therefore an object of the invention to provide a charge control device that can surely implement the charging operation within a predetermined time zone, and is advantageous in properly conducting the charging operation by the aid of the cheap electric power.

In order to achieve the object, according to the invention, there is provided a charge control device that is mounted in an electric vehicle including a travel battery, which supplies an electric power to a travel driving source, and a battery charger, which executes charging operation for charging the travel battery by using a power supply, the charge control device comprising: a communication unit that receives a first instruction for setting a charging wait period, which is a period for waiting the charging operation by the battery charger, and a second instruction for setting a charging period, which is a period for executing the charging operation, the first instruction and the second instruction being transmitted from a mobile device; a first timing unit that starts first timing operation for calculating a remaining charging wait period, which is a remaining period of the charging wait period, by subtracting an elapsed period from the charging wait period; a charging start unit that allows the battery charger to start the charging operation when the remaining charging wait period becomes zero; a second timing unit that starts second timing operation, together with start of the charging operation, for calculating a remaining charging period, which is a remaining period of the charging period, by subtracting an elapsed period from the charging period; and a charging stop unit that allows the battery charger to stop the charging operation when the remaining charging period becomes zero.

The charge control device may further include a period annunciation unit that transmits the remaining charging wait period and the remaining charge period to the mobile device through the communication unit to allow the mobile device to display the remaining charging wait period and the remaining charge period.

The charge control device may further include a determination unit that determines a first period as a display charging period if A>B is satisfied when A=T1−(24−TB), where A is the first period, B is a threshold period shorter than the charging period, T1 is the remaining charging wait period, and TB is the charging period, the determination unit that transmits the display charging period to the mobile device through the communication unit.

The charging period may be set in a scheduled charging operation, and the display charging period determination unit may determine a charging period, which is set in previous scheduled charging operation, as the display charging period if A>B is not satisfied.

The power supply may be a power supply supplied from an outlet provided in housing.

DETAILED DESCRIPTION OF EMBODIMENTS

Figure 1:
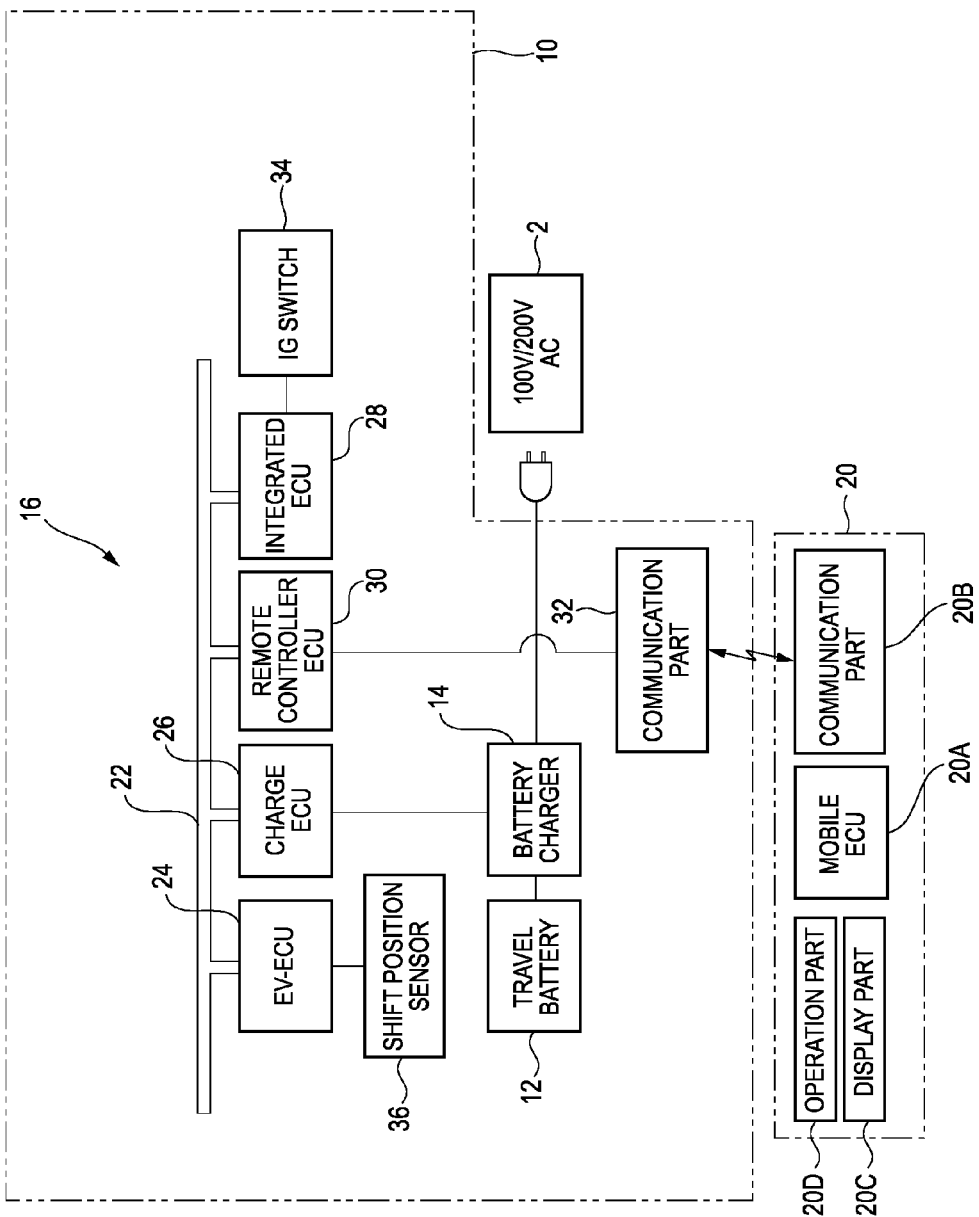
FIG. 1 is a block diagram illustrating a control system of an electric vehicle having a charge control device mounted thereon, and a configuration of a mobile device that remotely controls the charge control device according to an embodiment.

Hereinafter, embodiments of the present invention will be described with reference to the accompanying drawings. As illustrated in FIG. 1, a vehicle 10 is an electric vehicle, and a travel battery 12, a battery charger 14, and a charge control device 16 related to the present invention are mounted on the vehicle 10. In the present specification, the electric vehicle is directed to an automobile having a travel battery chargeable by an external power supply, and the electric vehicle includes an electric vehicle having only an electric motor as a travel driving source, and a plug-in hybrid vehicle having both of the electric motor and an engine as the travel driving source.

Figure 2:
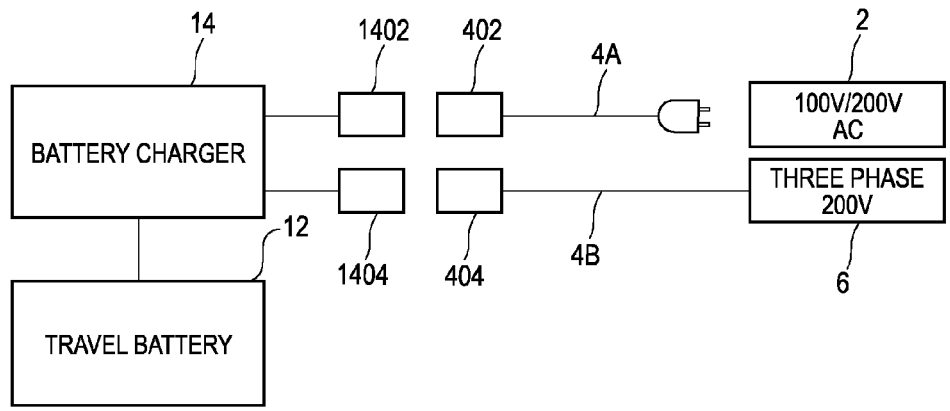
FIG. 2 is an illustrative diagram illustrating a battery charger connected to a power supply and a quick charging power supply.

The travel battery 12 supplies an electric power to the electric motor not shown which is the travel driving source, and configures a high voltage supply. The battery charger 14 charges the travel battery 12 by the aid of a power supply 2. In this embodiment, as illustrated in FIG. 2, the battery charger 14 includes a first power receiving connector 1402 for normal charge and a second power receiving connector 1404 for quick charge. The first power receiving connector 1402 is connected to a power receiving connector 402 of a dedicated charging cable 4A connected to an outlet of a housing. The second power receiving connector 1404 is connected to a power receiving connector 404 of a dedicated charging cable 4B connected to a quick charging power supply 6 having high voltage and high capacity placed on a dedicated plug-in station.

The battery charger 14 detects that the power supply 2, that is, AC 100 V or AC 200 V is applied to the first power receiving connector 1402, and conducts the normal charge at a normal charging rate by the aid of the power supply 2. In the normal charge, a charging period required for fully charging the travel battery 12 is, for example, about 14 hours (100 V) or about 7 hours (200V). Also, the battery charger 14 detects that the quick charging power supply 6 is applied to the second power receiving connector 1404, and conducts the quick charge at a charging rate higher than the normal charging rate by the aid of the quick charging power supply 6. In the quick charge, the charging period required for charging the travel battery 12 up to a charging capacity of 80% is a shorter period than the normal charge, for example, about 30 minutes.

Prior to description of the charge control device 16, a mobile device 20 that remotely controls the charge control device 16 will be described. In this embodiment, the mobile device 20 includes a mobile ECU 20A, a communication part 20B, a display part 20C, and an operation part 20D. The mobile device transmits and receives information through a radio communication with respect to a communication part 32, which will be described later, mounted in the vehicle 10 under the control of the mobile ECU 20A. The display part 20C displays characters, icons, and images according to a display signal supplied from the mobile ECU 20A. The operation part 20D is configured by, for example, a plurality of operation switches, and supplies an operation signal to the mobile ECU 20A according to operation on the operation switches. The operation switches are arbitrary, for example, a touch panel disposed in the display part 20C.

The mobile ECU 20A includes a CPU, a ROM that stores a control program therein, a RAM as an operation region of the control program, and an interface part that interfaces a peripheral circuit. The mobile ECU 20A operates by execution of the control program. Then, the remote control of the charge control device 16 is conducted by transmitting a charging wait period setting instruction and a charging period setting instruction from the communication part 20B to the communication part 32 of the charge control device 16, which will be described later, by the operation of the operation part 20D. The charging wait period setting instruction is an instruction for setting a charging wait period TA that is a period for waiting for the operation of charging the travel battery 12 by the battery charger 14. The charging period setting instruction is an instruction for setting a charging period TB that is a period for conducting the above charging operation. The determination of the charging wait period TA and the charging period TB, and the transmission of the charging wait period setting instruction and the charging period setting instruction is conducted by allowing operation menu to be displayed on the display part 20C by the operation of the operation part 20D, moving a cursor by the operation of the operation part 20D to select any item displayed on the operation menu, and conducting determination operation. Further, the mobile ECU 20A is provided with two flags indicated below.

1) Charging Wait Period Update Request Flag 2002

A charging wait period update request flag 2002 is set when the charging wait period TA in a remote controller ECU 30 of the charge control device 16 is updated, and transmitted from the communication part 20B to the communication part 32 of the charge control device 16 together with the charging wait period setting instruction. The charging wait period update request flag 2002 is cleared when a response that the charging wait period setting instruction has been received by the charge control device 16 is obtained from the communication part 32 of the charge control device 16 to the communication part 20B.

2) Charging Period Update Request Flag 2004

A charging period update request flag 2004 is set when the charging period TB in the remote controller ECU 30 of the charge control device 16 is updated, and transmitted from the communication part 20B to the communication part 32 of the charge control device 16 together with the charging period setting instruction. The charging period update request flag 2004 is cleared when the charging period setting instruction has been received by the charge control device 16 is obtained from the communication part 32 of the charge control device 16 to the communication part 20B.

Subsequently, the charge control device 16 will be described. As illustrated in FIG. 1, in the vehicle 10 are mounted the travel battery 12 and the battery charger 14 as well as an EV-ECU 24, a charge ECU 26, an integrated ECU 28, the remote controller ECU 30, the communication part 32, an IG switch 34, and a shift position sensor 36. The charge control device 16 includes the EV-ECU 24, the charge ECU 26, the integrated ECU 28, the remote controller ECU 30, the communication part 32, the IG switch 34, and the shift position sensor 36.

Each of the EV-ECU 24, the charge ECU 26, the remote controller ECU 30, and the integrated ECU 28 includes a CPU, a ROM that stores the control program therein, a RAM as an operation region of the control program, and an interface part that interfaces the peripheral circuit, and operates by execution of the control program. Also, the EV-ECU 24, the charge ECU 26, the remote controller ECU 30, and the integrated ECU 28 are connected to each other via a bus 22 indicated by a double line in FIG. 1, and transfer information with respect to each other. The bus 22 includes a CAN (controller area network) bus and a bus having a lower order than the CAN bus. The EV-ECU 24 conducts an electronic control of the entire vehicle 10, and is connected with the shift position sensor 36. The charge ECU 26 controls the operation of charging the travel battery 12 through the battery charger 14. Also, the charge ECU 26 monitors the amount of charge in the travel battery 12 through the battery charger 14, and calculates a ratio of the amount of charge when a full charge is set to 100%. The integrated ECU 28 controls various accessories mounted in the vehicle 10, and is connected with the IG switch 34.

The communication part 32 transmits and receives information with respect to the communication part 20B of the mobile device 20 through a radio communication under the control of the remote controller ECU 30. The IG switch 34 is operated for switching a position to OFF, ACC (accessory usable position), and ON (vehicle 10 travelable position). The shift position sensor 36 detects a shift lever position. The position of the IG switch 34 is supplied through the integrated ECU 28, and the detection result of the shift position sensor 36 is supplied through the EV-ECU 24, to the remote controller ECU 30 via the bus 22, respectively.

Figure 3:
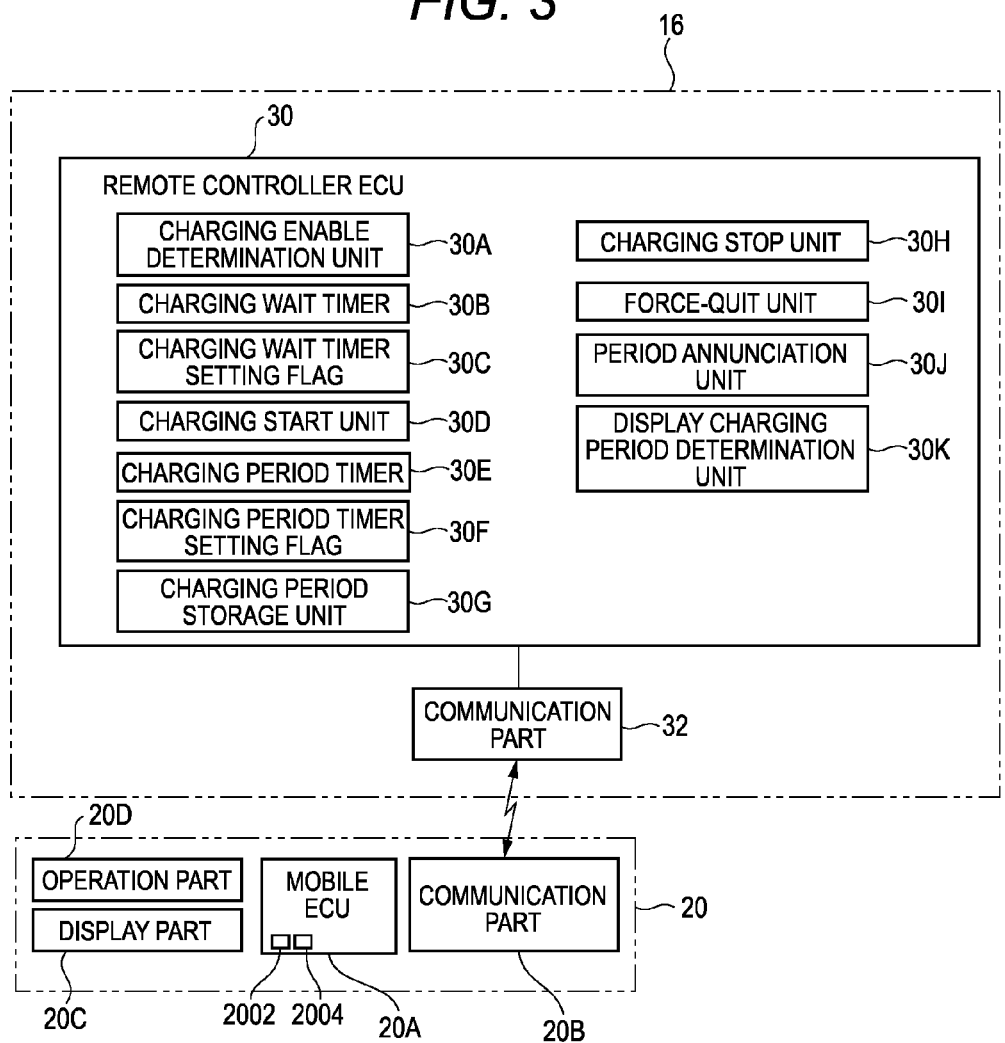
FIG. 3 is a functional block diagram of the charge control device.

Upon receiving the charging wait period setting instruction and the charging period setting instruction, which are transmitted from the mobile device 20, through the communication part 32, the remote controller ECU 30 executes control operation that will be described later. As illustrated in FIG. 3, the remote controller ECU 30 functionally includes a charging enable determination unit 30A, a charging wait timer 30B, a charging wait timer setting flag 30C, a charging start unit 30D, a charging period timer 30E, and a charging period timer setting flag 30F. The remote controller ECU 30 also includes a charging period storage unit 30G, a charging stop unit 30H, a force-quit unit 30I, a period annunciation unit 30J, and a display charging period determination unit 30K. Those respective units and the respective flags are realized by executing the control program by the CPU.

Upon receiving the charging wait period setting instruction and the charging period setting instruction by the communication part 32, the charging enable determination unit 30A determines whether charging enable conditions required for execution of the charging operation are satisfied, or not. The charging enable conditions are exemplified as follows.

1) The power supply 2 is connected to the first power receiving connector 1402 of the battery charger 14. This is indicative of a fact that the operation of charging the battery charger 14 is the normal charge but not the quick charge.

2) The IG switch 34 is at the OFF position. This is because the vehicle 10 is required to park during charging.

3) The shift position detected by the shift position sensor 36 is P (parking). This is because the vehicle 10 is required to park during charging.

4) No abnormality is detected in all of the EV-ECU 24, the charge ECU 26, and the remote controller ECU 30.

In this embodiment, if the charging enable conditions are satisfied, that is, if the charging is scheduled, the charging enable determination unit 30A transmits a charging enable response indicative of this fact to the mobile device 20 through the communication part 32.

The charging wait period TA is set for the charging wait timer 30B according to the charging wait period setting instruction. If the charging enable conditions are satisfied, the charging wait timer 30B starts first timing operation for calculating a remaining charging wait period T1 which is a remaining time of the charging wait time by subtracting an elapsed period from the charging wait period set according to the charging wait period setting instruction. The charging wait timer 30B is configured such that so far as the charging wait period TA is not newly set, the remaining charging wait period T1 is set to zero, and also 24 hours (24 h) is automatically set as the charging wait period TA to execute the first timing operation. If the charging enable conditions are set, that is, if the charging is scheduled, the charging wait timer setting flag 30C is set, and if the operation of charging the travel battery 12 starts, the remote controller ECU 30 is cleared. The remote controller ECU 30 allows the battery charger 14 to start the charging operation if the remaining charging wait period T1 becomes zero.

The charging period TB is set for the charging period timer 30E according to the charging period setting instruction. Together with start of the charging operation, the charging period timer 30E starts second timing operation for calculating a remaining charging period T2 that is a remaining period of the charging period by subtracting the elapsed period from the charging period TB. The charging period timer 30E holds zero until the timer is newly set after the remaining charging period T2 becomes zero. The previous charging period TB is held as "charging period data", and when the charging period TB is newly set by the remote controller, a value of "charging period data" is displayed as a default display. If the remote controller setting time has already elapsed the previous charging start time, a period from which the elapsed period is subtracted is displayed. The user sets the changed value (or the unchanged value) for the charging period timer (charging period timer 30E). If the charging enable conditions are satisfied, that is, if the charging is scheduled, the charging period timer setting flag 30F is set, and if the operation of charging the travel battery 12 starts, the charging period timer setting flag 30F is cleared. The charging period storage unit 30G stores the charging period TB set in the charging period timer 30E therein according to the charging period setting instruction.

If the remaining charging period T2 becomes zero, the charge stop unit 30H allows the battery charger 14 to stop the charging operation. The force-quit unit 30I determines whether control termination condition necessary for terminating the charging operation is satisfied during the charging operation, or not. If it is determined that the control termination condition is satisfied, the force-quit unit 30I forcedly terminates the charging operation of the battery charger 14. If at least one of the charging enable conditions is not satisfied, or if the travel battery 12 is fully charged, the control termination condition is satisfied. That is, if at least one of the conditions exemplified as follows is satisfied, it is determined that the control termination condition is satisfied.

1) A connection between the first power receiving connector 1402 of the battery charger 14 and the power supply 2 is canceled.

2) The IG switch 34 is changed except for the OFF position.

3) The shift position detected by the shift position sensor 36 is changed except for P (parking).

4) Abnormality is detected in at least one of the EV-ECU 24, the charge ECU 26, and the remote controller ECU 30.

5) It is detected that the amount of charge in the travel battery 12 is fully charged by the battery charger 14.

The period annunciation unit 30J transmits the remaining charging wait period T1 and the remaining charging period T2 to the mobile device 20 through the communication part 32. If it is assumed that a charging period during which the charging is enabled at a time when the charging is again scheduled after the charging schedule has been executed once is set as a display charging period T3, the display charge period determination unit 30K determines the display charging period T3, and transmits the determined display charging period T3 to the mobile device 20. The display charge period determination unit 30K will be described in detail later.

Figure 4:
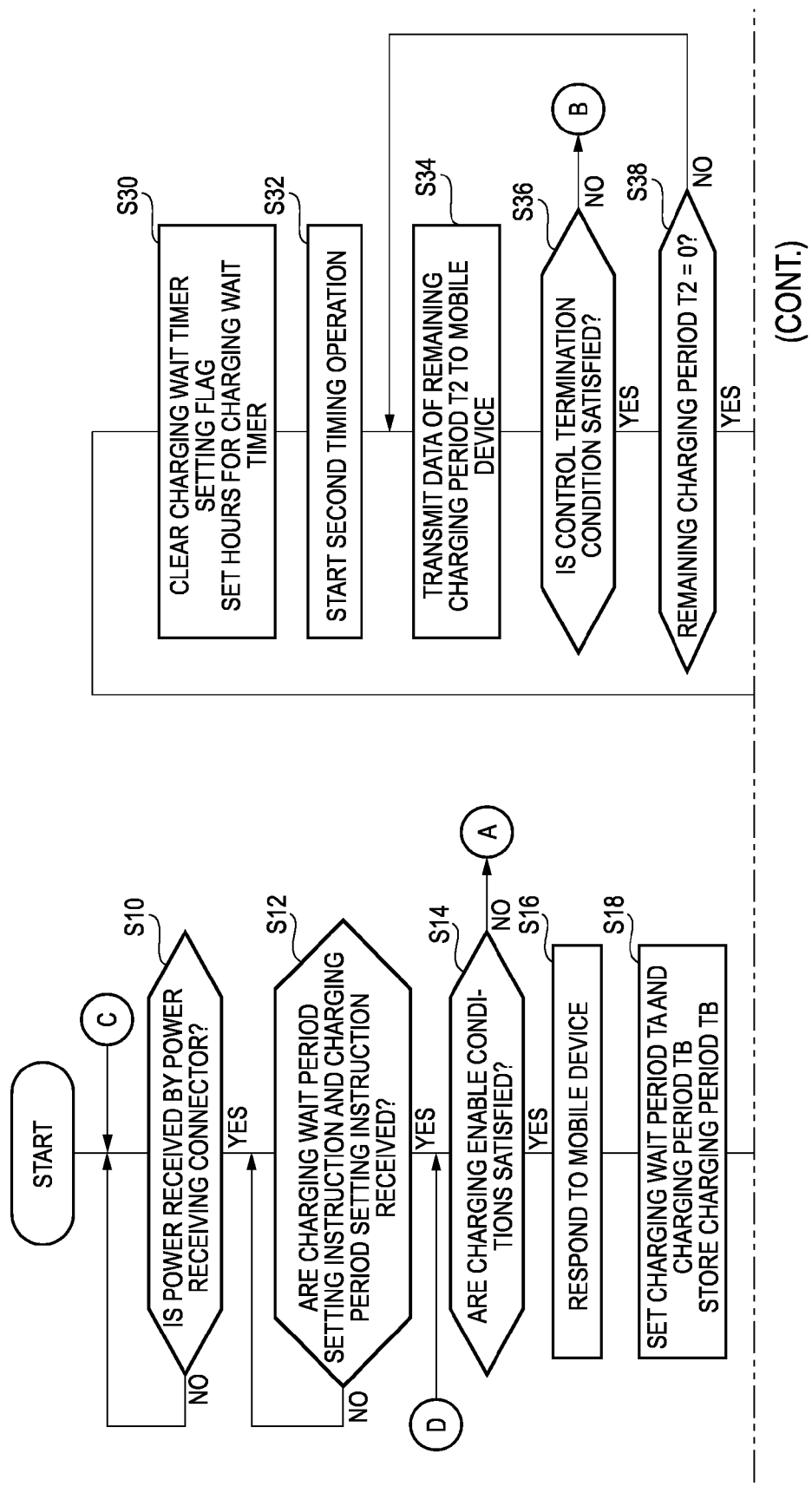
FIG. 4 is a flowchart illustrating a flow of a first scheduled charging operation by the charge control device.

Subsequently, the operation of the charge control device 16 will be described with reference to a flowchart of FIG. 4. In the following example, a description will be given of a case in which the power supply 2 is connected to the first power receiving connector 1402 of the vehicle 10 during parking, and the charging schedule is conducted by the aid of the mobile device 20. Also, in this embodiment, it is assumed that the time zone of the late-night electric power is 23:00 to 8:00 the next day. The remote controller ECU 30 determines whether the power supply 2 has been connected to the first power receiving connector 1402 through the battery charger 14, or not (Step S10). If no in Step S100, the operation is returned to Step S10. If yes in Step S10, the remote controller ECU 30 determines whether the communication part 32 has received the charging wait period setting instruction and the charging period setting instruction from the mobile device 20, or not (Step S12). If no in Step S12, the operation is returned to Step S12. If yes in Step S12, the remote controller ECU 30 determines whether the charging enable conditions are satisfied, or not (Step S14, charging enable determination unit 30A). If no in Step S14, the remote controller ECU 30 transmits an error message indicative of why the charging enable conditions are not satisfied from the communication part 32 to the mobile device 20. Then, the remote controller ECU 30 allows the display part 20C of the mobile device 20 to display a fact that the charging schedule is disabled, and an error code or an error message (Step S48), and returns the operation to Step S10. The types of the error code or the error message are exemplified as follows.

1) A connection between the first power receiving connector 1402 of the battery charger 14 and the power supply 2 is canceled.

2) The IG switch 34 is at any position except for the OFF position.

3) The shift position is at any position except for P (parking).

4) Abnormality is detected in at least one of the EV-ECU 24, the charge ECU 26, and the remote controller ECU 30.

If yes in Step S14, the remote controller ECU 30 transmits a response indicative of reception of the charging wait period setting instruction and the charging period setting instruction from the communication part 32 to the remote controller ECU 30 (Step S16). Upon receiving the response, the mobile ECU 20A of the remote controller ECU 30 clears a charging wait period update request flag 2002 and a charging period update request flag 2004. The charging wait period setting instruction received by the remote controller ECU 30 includes the charging wait period update request flag 2002 (set state) indicating that the charging wait period TA is updated, and the charging wait period TA. Also, the charging period setting instruction received by the remote controller ECU 30 includes the charging period update request flag 2004 (set state) indicating that the charging period TB is updated, and the charging period TB. Accordingly, the remote controller ECU 30 sets the received charging wait period TA for the charging wait timer 30B, sets the received charging period TB for the charging period timer 30E, and stores the charging period TB in the charging period storage unit 30G (Step S18). Then, the remote controller ECU 30 sets the charging wait timer setting flag 30C and the charging period timer setting flag 30F, respectively (Step S20).

Figure 7A:
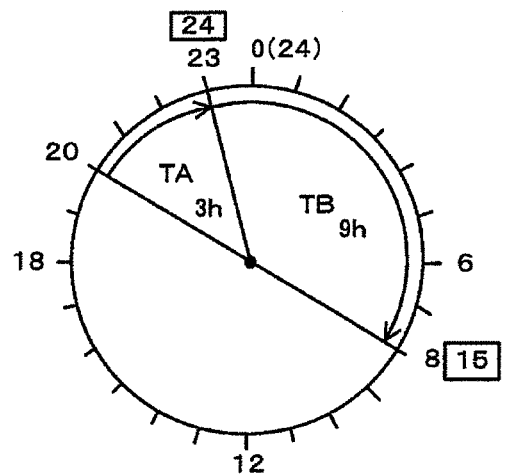
FIG. 7A is a schematic diagram illustrating a charging wait period and a charging period in the first scheduled charging operation.

Then, the charging wait timer 30B starts the first timing operation (Step S22). In this embodiment, a description will be given assuming that the charging wait period TA=3 hours, the charging period TB=9 hours, and a time at which the first timing operation starts is 20:00 as illustrated in FIG. 7A. The remote controller ECU 30 transmits data of the remaining charging wait period T1 timed by the charging wait timer 30B from the communication part 32 to the mobile device 20 every predetermined period (Step S24: period annunciation unit 30J). On the other hand, the mobile ECU 20A allows the remaining charging wait period T1 received by the communication part 20B to be digitally displayed on the display part 20C in real time, and also allows the charging period TB to be digitally displayed on the display part 20C. Accordingly, the user can confirm the charging period TB, and can know the remaining charging wait period T1 in real time. Because there is a limit to the number of segments in the display part 20C, the remaining charging wait period T1 and the charging period TB are switchingly displayed.

In this example, because display in the mobile device is not time information but period information, the display becomes ○○.○ period, and is smaller in the number of display segments than the display such as ○○:○○ using the time display, which is favorable for a reduction in the size and costs of the mobile device.

Then, the remote controller ECU 30 determines whether the remaining charging wait period T1 has become zero, or not (Step S26: charging start unit 30D). If no in Step S26, the operation returns to Step S24. If yes in step S26, the remote controller ECU 30 allows the battery charger 14 to start the operation of charging the travel battery 12 (Step S28: charging start unit 30D). Further, the remote controller ECU 30 clears the charging wait timer setting flag 30C, and sets 24 hours for the charging wait timer 30B (Step S30). As a result, the charging wait timer 30B again executes the timing operation from a state of the remaining charging wait period T1=24 hours. Also, the charging period timer 30E starts the second timing operation (Step S32). That is, as illustrated in FIG. 7A, after the charging wait timer 30B has terminated the operation of timing the charging wait period TA of 3 hours, the charging period timer 30E starts the operation of timing the charging period TB of 9 hours. Also, the charging wait timer 30B restarts the operation of timing the remaining charging wait period T1=24 hours from a time 23:00. In the figure, numerals surrounded by rectangular frames indicate the remaining charging period T2 timed by the timing operation restarted by the charging wait timer 30B. The remote controller ECU 30 transmits data of the remaining charging period T2 timed by the charging period timer 30E from the communication part 32 to the mobile device 20 every predetermined period (Step S34: period annunciation unit 30J). On the other hand, the charging enable determination unit 30A allows the remaining charging period T2 received by the communication part 20B to be displayed on the display part 20C in real time. Accordingly, the user can know the remaining charging period T2 in real time. In this case, because there is no need to display the charging wait period TA (or the remaining charging wait period T1), the charging wait period TA (or the remaining charging wait period T1) is not displayed (blanked) in the display part 20C.

The remote controller ECU 30 determines whether the control termination condition has been satisfied, or not (Step S36: force-quit unit 30I). If yes in Step S36, the remote controller ECU 30 allows the battery charger 14 to stop the operation of charging the travel battery 12 (Step S50: force-quit unit 30I). Then, the remote controller ECU 30 transmits the code or message indicating the cause of stopping the charging operation from the communication part 32 to the mobile device 20, and allows the display part 20C of the mobile device 20 to display a fact that the charging operation stops and the message (Step S52), and returns the operation to Step S10. The type of the code or message is identical with that of the error message described in the above-mentioned Step S48, or the code or message indicative of full charge of the travel battery 12. If no in Step S36, the remote controller ECU 30 determines whether the remaining charging period T2 becomes zero, or not (Step S38: charging stop unit 30H). If no in Step S38, the operation returns to Step S34. If yes in Step S38, the remote controller ECU 30 allows the battery charger 14 to stop the operation of charging the travel battery 12 (Step S40: charging stop unit 30H). As a result, as illustrated in FIG. 7A, the operation of charging the travel battery 12 is terminated at 8:00 after the charging period TB of 9 hours. Also, at a time of 8:00 when the charging operation has been terminated, the remaining charging wait period of the charging wait timer 30B is 15 hours, and even after the charging operation has stopped, the timing operation of the charging wait timer 30B is continuously executed. Then, the remote controller ECU 30 transmits a message indicating that the scheduled charging operation has been terminated from the communication part 32 to the mobile device 20, and allows the display part 20C of the mobile device 20 to display the code or message that the scheduled charging operation has been terminated (Step S42). In this case, because there is no need to display the charging wait period TA (remaining charging wait period T1), the charging wait period TA is not displayed (blanked), and the charging period TB (remaining charging period T2) holds 0-hours display in the sense that the charging termination is displayed.

In this example, the remote controller ECU 30 stores the present charging period TB in the charging period storage unit 30G as "charging period data" for setting a subsequent charging schedule as described above (Step S44). In this way, a series of scheduled charging operation is terminated. At a time of terminating the scheduled charging operation, a state in which the charging period timer setting flag 30F is set in Step S20 is maintained, and a state in which the charging wait timer setting flag 30C is cleared in Step S30 is maintained.

Figure 5:
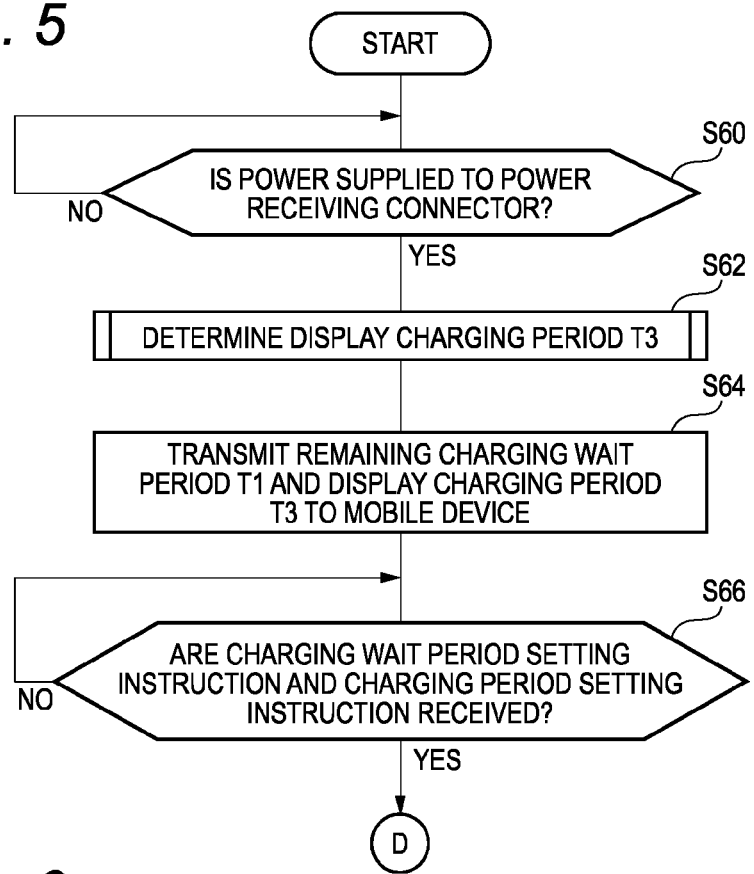
FIG. 5 is a flowchart illustrating a flow of the second and subsequent scheduled charging operation by the charge control device.
Figure 6:
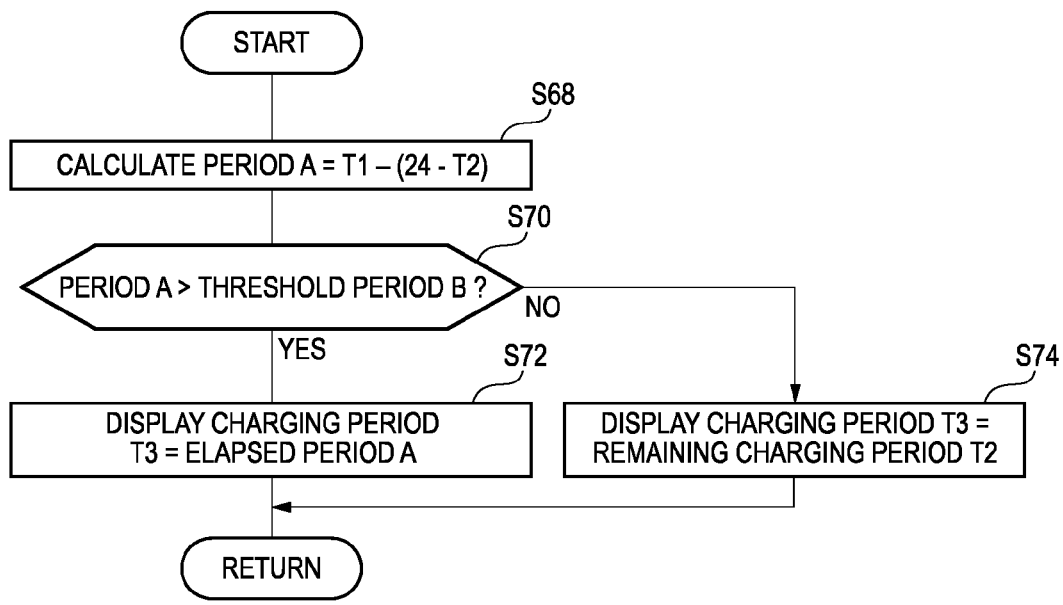
FIG. 6 is a flowchart illustrating a subroutine for determining a display charging time.
Figure 7B:
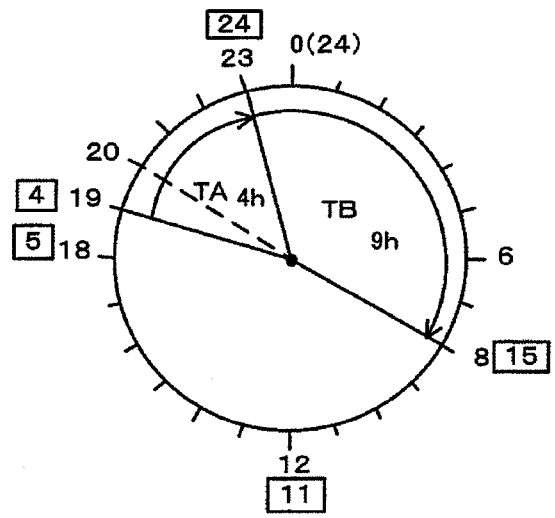
FIG. 7B is a schematic diagram illustrating the charging wait period and the charging period in the second scheduled charging operation.

A case in which after the vehicle 10 travels by the aid of the travel battery 12 that has been charged according to the schedule as described above, the scheduled charging operation is again conducted will be described with reference to flowcharts of FIGS. 5 and 6. In this example, as illustrated in FIG. 7B, a description will be given of a case in which the power supply 2 is connected to the first power receiving connector 1402 for conducting the scheduled charging operation at a time 19:00 earlier by one hour than a time 20:00 which is the start time of the previous scheduled charging operation. As illustrated in FIG. 5, the remote controller ECU 30 determines whether the power supply 2 has been connected to the first power receiving connector 1402 through the battery charger 14, or not (Step S60). If no in Step S60, the operation returns to Step S60. If yes in Step S60, the remote controller ECU 30 determines the display charging period T3 to be transmitted to the mobile device 20 (Step S62: display charging period determination unit 30K). The display charging period T3 represents a charging period during which the scheduled charging operation is enabled.

A sub-routine in Step S62 will be described with reference to FIG. 6. The remote controller ECU 30 calculates the time A=the charging wait period T1−(24−the charging period TB) (Step S68). A period A is a period used for calculating a period during which the charging operation is enabled when the charging termination time in the previously executed charging operation is fixed, and the charging period is set with the previously set charging period TB as an upper limit. Then, the remote controller ECU 30 determines whether period A>threshold period B (B is a predetermined threshold period shorter than the charging period TB) is satisfied, or not (Step S70). If yes in Step S70, the remote controller ECU 30 determines the above period A as the display charging period T3 (Step S72). That is, strictly, if the period A>0 is satisfied, the period A becomes the charging period that can be realized at a time when the period A>0 has been satisfied. However, if the period A is too short, the charging operation cannot be substantially executed. Therefore, a period during which the charging operation may be sufficiently conducted as the threshold period B, for example, 0.5 hours as the threshold period B are determined. If the period A is larger than the threshold period B, the period A is determined as the display charging period T3. If no in Step S79, that is, if the period A>the threshold period B is not satisfied, the remote controller ECU 30 determines the charging period TB set as the charging period according to the charging period setting instruction in conducting the previous scheduled charging operation as the display charging period T3 (Step S74). The previously set charging period TB is stored in the charging period storage unit 30G. If period A>threshold period B is not satisfied, there are two cases of threshold period B≥period A>0 and period A<0, and the following respective processing is conducted.

1) In a case of threshold period B≥period A>0, the period A is too short, and the charging operation cannot be substantially executed. Accordingly, the charging period during which the previous scheduled charging operation can be realized is the previously set charging period TB, and the charging period TB is determined as the display charging period T3.

2) In a case of period A<0, because a time when period A<0 is before the start time of the previously set charging period TB, the realizable charging period in this case is the previously set charging period TB, and the charging period TB is determined as the display charging period T3.

If the display charging period T3 is determined, the operation returns to FIG. 5, and the remote controller ECU 30 transmits the remaining charging wait period T1 and the display charging period T3 to the mobile device 20 through the communication part 32 (Step S64: display charging period determination unit 30K). If the display charging period T3 is smaller than the charging period TB, since the remote controller ECU 30 starts the charging operation without waiting for the charging operation (the charging wait period TA is zero), the remote controller ECU 30 transmits the remaining charging wait period T1 as zero. On the other hand, the mobile ECU 20A of the mobile device 20 allows the display part 20C to display the received remaining charging wait period T1 as the charging period TB. The user determines the charging wait period TA and the charging period TB as they are, which are displayed by operating the operation part 20D, if the charging wait period TA and the charging period TB, which are displayed at that time, are acceptable. As a result, the charging wait period setting instruction and the charging period setting instruction are transmitted from the communication part 20B of the mobile device 20. Also, if the user intends to change the charging wait period TA and the charging period TB, which are displayed at this time, the user operates the operation part 20D to change and determine the charging wait period TA and the charging period TB. As a result, the charging wait period setting instruction and the charging period setting instruction are transmitted from the communication part 20B of the mobile device 20. Then, the remote controller ECU 30 determines whether the communication part 32 has received the charging wait period setting instruction and the charging period setting instruction from the mobile device 20, or not (Step s66). If no in Step S66, the operation returns to Step S66. If yes in Step s66, the operation is shifted to Step S14 of FIG. 4, and the same processing is subsequently executed.

The operation will be described in detail with reference to FIGS. 7B and 7C. FIG. 7B illustrates a case in which the power supply 2 is connected to the first power receiving connector 1402 at a time 19:00 earlier by one hour than a time 20:00 which is the start time of the previous scheduled charging operation. For that reason, 4 hours is displayed as the charging wait period TA on the display part 20C of the mobile device 20, and 9 hours that are identical with those in the previous operation are displayed as the charging period TB. That is, because the remaining charging wait period T1=4 hours, and the charging period TB=9 hours, the period A=the remaining charging wait period T1−(24−the charging period TB)=4−(29−9)=−19 hours<0 is satisfied. Therefore, the charging period TB is determined as the display charging period T3, and the charging period TB is displayed on the display part 20C of the mobile device 20 as a new chargeable charging period TB. Accordingly, if the user determines the charging wait period TA and the charging period TB without any change at this time, after the charging wait is conducted for 4 hours, the charging operation is conducted for 9 hours.

Figure 7C:
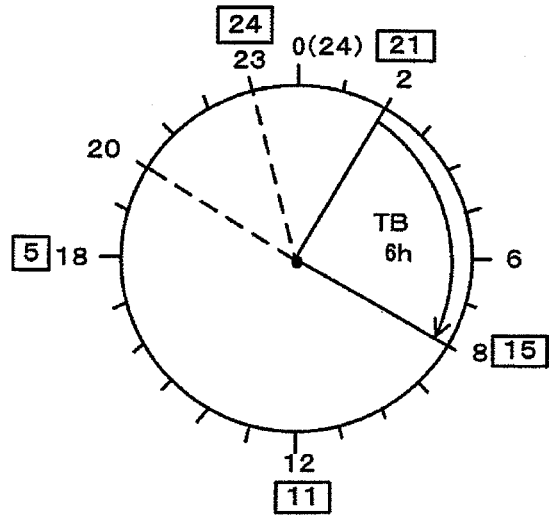
FIG. 7C is a schematic diagram illustrating the charging wait period and the charging period in the second scheduled charging operation according to another example.

Also, FIG. 7C illustrates a case in which the power supply 2 is connected to the first power receiving connector 1402 at a time 2:00 the next data later by 6 hours than a time 20:00 which is the start time of the previous scheduled charging operation. In this case, because it runs over the time 23:00 which is the previous charging operation start time by 3 hours, zero is displayed as the charging wait period TA, and 6 hours obtained by subtracting 3 hours from 9 hours are displayed as the charging period TB, on the display part 20C of the mobile device 20. That is, because the remaining charging wait period T1=21 hours, and the previous charging period TB=9 hours, the time A=the remaining charging wait period T1−(24−the charging period TB)=21−(24−9)=6 hours>B is satisfied. Therefore, the time A=6 hours is determined as the display charging period T3, and 6 hours are displayed on the display part 20C of the mobile device 20 as a new chargeable charging period TB. Accordingly, if the user determines the charging period TB=A=6 hours without any change at this time, the charging operation immediately starts, and the charging operation is conducted for 6 hours.

As has been described above, according to the charge control device 16 of this embodiment, the charging wait period TA and the charging period TB are set for the charging wait timer 30B and the charging period timer 30E by the mobile device 20, respectively. If the charging enable conditions are satisfied, the timing operation of the charging wait timer 30B and the second timing operation of the charging period timer 30E are conducted whereby the operation of charging the travel battery 12 is executed for the charging period TB after waiting for the charging wait period TA.

Accordingly, because the start time and the termination time of the charging operation are substantially defined by the charging wait period TA and the charging period TB, the charging operation can be surely implemented within the predetermined time zone. Further, this configuration is favorable for adequately conducting the charging operation by the aid of the cheap electric power such as a late-night electric power, and also favorable for the cost performance since setting is conducted by not time but period to reduce the amount of information.

Also, in this embodiment, there is provided the period annunciation unit 30J that transmits the remaining charging wait period T1 and the remaining charging period T2 to the mobile device 20 via the communication part 32. Therefore, the remaining charging wait period T1 and the remaining charging period T2 can be confirmed in the mobile device 20, which is favorable for proper provision of information on the scheduled charging operation of the travel battery 12 to the user. Since management is conducted by period information, the display area on the mobile device can be reduced.

Further, in this embodiment, the charging period during which the charging operation can be conducted by the scheduled charging operation is determined as the display charging period T3 by the display charging period determination unit 30K, and transmitted to the mobile device 20. This configuration is favorable for proper provision of information on the scheduled charging operation of the travel battery 12 to the user.

According to an aspect of the invention, because the start time and the termination time of the charging operation are substantially set by transmission of the charging wait period and the charging period from a mobile device, the charging operation can be surely implemented within the predetermined time zone. Further, this configuration is favorable for adequately conducting the charging operation, and also favorable for the cost performance since setting is conducted by not time but period to reduce the amount of information.

What is claimed is:

1. A charge control device that is mounted in an electric vehicle including a travel battery, which supplies an electric power to a travel driving source, and a battery charger, which executes charging operation for charging the travel battery by using a power supply, the charge control device comprising:
   a communication unit that receives a first instruction for setting a charging wait period, which is a period for waiting the charging operation by the battery charger, and a second instruction for setting a charging period, which is a period for executing the charging operation, the first instruction and the second instruction being transmitted from a mobile device;
   a first timing unit that starts first timing operation for calculating a remaining charging wait period, which is a remaining period of the charging wait period, by subtracting an elapsed period from the charging wait period;
   a charging start unit that allows the battery charger to start the charging operation when the remaining charging wait period becomes zero;
   a second timing unit that starts second timing operation, together with start of the charging operation, for calculating a remaining charging period, which is a remaining period of the charging period, by subtracting an elapsed period from the charging period; and
   a charging stop unit that allows the battery charger to stop the charging operation when the remaining charging period becomes zero.

2. The charge control device according to claim 1 further comprising:
   a period annunciation unit that transmits the remaining charging wait period and the remaining charge period to the mobile device through the communication unit to allow the mobile device to display the remaining charging wait period and the remaining charge period.

3. The charge control device according to claim 1 further comprising:
   a determination unit that determines a first period as a display charging period if A>B is satisfied when A=T1−(24−TB), where A is the first period, B is a threshold period shorter than the charging period, T1 is the remaining charging wait period, and TB is the charging period, the determination unit that transmits the display charging period to the mobile device through the communication unit.

4. The charge control device according to claim 2 further comprising:
   a determination unit that determines a first period as a display charging period if A>B is satisfied when A=T1−(24−TB), where A is the first period, B is a threshold period shorter than the charging period, T1 is the remaining charging wait period, and TB is the charging period, the determination unit that transmits the display charging period to the mobile device through the communication unit.

5. The charge control device according to claim 3, wherein the charging period is set in a scheduled charging operation, and
   the display charging period determination unit determines a charging period, which is set in previous scheduled charging operation, as the display charging period if A>B is not satisfied.

6. The charge control device according to claim 4, wherein
the charging period is set in a scheduled charging operation, and
the display charging period determination unit determines a charging period, which is set in previous scheduled charging operation, as the display charging period if A>B is not satisfied.

7. The charge control device according to claim 1, wherein
the power supply is a power supply supplied from an outlet provided in housing.

8. The charge control device according to claim 2, wherein
the power supply is a power supply supplied from an outlet provided in housing.

9. The charge control device according to claim 3, wherein
the power supply is a power supply supplied from an outlet provided in housing.

10. The charge control device according to claim 4, wherein
the power supply is a power supply supplied from an outlet provided in housing.

11. The charge control device according to claim 5, wherein
the power supply is a power supply supplied from an outlet provided in housing.

12. The charge control device according to claim 6, wherein
the power supply is a power supply supplied from an outlet provided in housing.

* * * * *